US007680772B2

(12) United States Patent
Kronberg

(10) Patent No.: US 7,680,772 B2
(45) Date of Patent: Mar. 16, 2010

(54) SEARCH QUALITY DETECTION

(75) Inventor: Martin Kronberg, Ottawa (CA)

(73) Assignee: Intuit Inc., Mountain View, CA (US)

(*) Notice: Subject to any disclaimer, the term of this patent is extended or adjusted under 35 U.S.C. 154(b) by 409 days.

(21) Appl. No.: 11/077,047

(22) Filed: Mar. 9, 2005

(65) Prior Publication Data

US 2006/0206455 A1   Sep. 14, 2006

(51) Int. Cl.
*G06F 17/30* (2006.01)
(52) U.S. Cl. .......................................... 707/3
(58) Field of Classification Search .............. 707/3, 707/5–7
See application file for complete search history.

(56) References Cited

U.S. PATENT DOCUMENTS

| | | | | |
|---|---|---|---|---|
| 5,973,683 A * | 10/1999 | Cragun et al. | 715/719 |
| 6,385,602 B1 * | 5/2002 | Tso et al. | 707/3 |
| 6,493,711 B1 * | 12/2002 | Jeffrey | 707/5 |
| 6,789,076 B1 * | 9/2004 | Dutta | 707/5 |
| 6,873,982 B1 * | 3/2005 | Bates et al. | 707/5 |
| 6,961,723 B2 * | 11/2005 | Faybishenko et al. | 707/3 |
| 7,003,503 B2 * | 2/2006 | Crosby et al. | 706/48 |
| 7,028,026 B1 * | 4/2006 | Yang et al. | 707/3 |
| 7,031,952 B1 * | 4/2006 | Heumann et al. | 707/1 |
| 7,099,859 B2 * | 8/2006 | Sundaresan | 707/3 |
| 7,197,497 B2 * | 3/2007 | Cossock | 707/7 |
| 7,200,606 B2 * | 4/2007 | Elkan | 707/102 |
| 7,281,002 B2 * | 10/2007 | Farrell | 707/3 |
| 7,346,604 B1 * | 3/2008 | Bharat et al. | 707/3 |
| 7,505,964 B2 * | 3/2009 | Tong et al. | 707/3 |
| 2002/0129015 A1 * | 9/2002 | Caudill et al. | 707/6 |
| 2003/0018659 A1 * | 1/2003 | Fuks et al. | 707/500 |
| 2004/0083211 A1 * | 4/2004 | Bradford | 707/3 |
| 2004/0267717 A1 * | 12/2004 | Slackman | 707/3 |
| 2005/0120006 A1 * | 6/2005 | Nye | 707/3 |
| 2006/0004891 A1 * | 1/2006 | Hurst-Hiller et al. | 707/204 |
| 2006/0026152 A1 * | 2/2006 | Zeng et al. | 707/5 |
| 2006/0031214 A1 * | 2/2006 | Solaro et al. | 707/4 |

* cited by examiner

*Primary Examiner*—Tim T. Vo
*Assistant Examiner*—Michelle Owyang
(74) *Attorney, Agent, or Firm*—Osha Liang LLP

(57) ABSTRACT

In various embodiments, the present invention provides methods and systems for categorizing the quality of a search by analyzing the relevancy numbers associated with the search results. The relevancy numbers are compared to established patterns to categorize the quality of the search query. Based on this categorization, the system alters the display parameters of the results, such as the number of results to display, the message to display to the user, or in some embodiments, a subsequent action the system executes.

36 Claims, 7 Drawing Sheets

| Search Category | Search Quality: | Number of Results Displayed: | Tips Displayed: |
|---|---|---|---|
| 1 | Excellent Results | 7 | No Tips |
| 2 | Good Results | 9 | No Tips |
| 3 | Too Many Hits | 10 | Suggestions: Try making your search more specific. Rephrase your request as a simple question. |
| 4 | Relevancy Too Low | 3 | Suggestions: Check your spelling. Try using different terminology. |

Example #1: Search String: "check"

| Relevancy | Topic Title |
|---|---|
| 100 | Printing Checks |
| 100 | Reprinting checks |
| 100 | Finding a check |
| 100 | Writing a check |
| 100 | Finding a check |
| 100 | Editing information on a check |
| 98 | Checking the Status of your entire inventory |
| 98 | Checking your inventory status |
| 98 | Missing checks report |
| 98 | Check detail report |

Example #2: Search String: "printing a check"

| Relevancy | Topic Title |
|---|---|
| 100 | Printing Checks |
| 98 | Printing check vouchers |
| 98 | Problems with printing checks |
| 93 | Printing a single check |
| 91 | My checks did not print correctly |
| 63 | Selecting a style for printed checks |
| 63 | Ways to display the Print Checks window |
| 61 | Printing check voucher detail on plain paper |
| 60 | Printing your company name on plain paper |
| 60 | Printing a partial first page of checks |

Example #3: Search String: "printing a chekc"

| Relevancy | Topic Title |
|---|---|
| 48 | Printing Statements |
| 48 | Printing To Do notes |
| 48 | Previewing how something will print |
| 48 | Printing faster |
| 48 | Printing a report |
| 48 | Printing weekly timesheets |
| 48 | Printing a register |
| 48 | Printing paystubs |
| 48 | Printing paychecks |
| 48 | Previewing before you print |

Example #4: Search String: "how do I void a check?"

| Relevancy | Topic Title |
|---|---|
| 100 | Voiding or deleting a check |
| 38 | How to I handle ruined checks? |
| 35 | Voiding paychecks (Assisted Payroll) |
| 34 | What if the paycheck isn't displayed in the Edit/Void Paychecks window? |
| 34 | Voiding paychecks (using QuickBooks Payroll or with no payroll service) |
| 34 | How do I handle ATM withdrawals from my checking account? |
| 33 | How to use registers |
| 23 | Checking your inventory status |
| 23 | Missing checks report |
| 23 | Check detail report |

FIG. 1

| Search Category | Search Quality: | Number of Results Displayed: | Tips Displayed: |
|---|---|---|---|
| 1 | Excellent Results | 7 | No Tips |
| 2 | Good Results | 9 | No Tips |
| 3 | Too Many Hits | 10 | Suggestions: Try making your search more specific. Rephrase your request as a simple question. |
| 4 | Relevancy Too Low | 3 | Suggestions: Check your spelling. Try using different terminology. |

FIG. 6

SEARCH QUALITY DETECTION

FIELD OF THE INVENTION

This invention relates to systems and methods of presenting search results. Specifically, this invention uses relevancy metrics associated with search results to categorize the search, and the presentation of the search results is altered accordingly.

BACKGROUND

Search engines are tools used to perform searches based on a query and return results or hits either as electronic documents or links to electronic documents that match the query. Due to the proliferation of information available in electronic sources, it has become increasingly important to avoid overwhelming a user with information likely to be irrelevant. Moreover, it is increasingly important to aid the user in navigating the relevant information more efficiently.

In service of these goals, most search engines contain an internal algorithm to determine which documents are most relevant to the search query. For example, some search engine algorithms consider both the frequency and the positioning of keywords in document to determine relevancy. If a keyword only appears once in a footnote to a document, there is a relatively small chance that the document contains the information a user is seeking by searching for the keyword. In contrast, if keywords appear repeatedly in a document and appear in the document title or headings, there is a relatively greater likelihood that the document contains information about the keywords that would be relevant, and hence useful, to the user. Whereas the first would result in a low relevancy number associated with the document, the latter would result in a higher relevancy number. Although general principles such as these are known in the art of search engine software engineering, the exact algorithms used by a search engine to determine a relevancy metric are usually proprietary information protected as trade secrets.

Once a search is run and relevancy is calculated for each result, the results are then sorted according to the relevancy metric, and the results list can be displayed in this order to the user. Since the most relevant results appear at the top of the list, users who begin scanning results encounter first those results most likely to contain useful information.

Some conventional search engine systems display a given number of search results, such as the top 100 results for a search, regardless of what search query is entered. If a search is too broad, the user may end up wasting time reading too many results in an attempt to find a real result of interest, or worse, the real result of interest might not have made the top 100 list. If a search query contains a spelling mistake, typographical error, or a terminology difference, the results returned may be entirely irrelevant to the user. With conventional search engine systems, the user must figure out how to change in the query in order to improve results. A higher quality search (i.e., one that is not too broad, too narrow, containing a spelling mistake, or the like) would help them locate desired information more efficiently.

Some search engines display the relevancy metric, which savvy users may use to interpret the quality of their results and modify their queries accordingly. An example of a search engine that displays relevancy metrics associated with each result is AnswerWorks® by Vantage Software Technologies. However, either from lack of familiarity with the relevancy metric or a failure to understand the significance of relevancy patterns in results, users may still not know how to improve their results or even that it would benefit them to try to do so.

Accordingly, systems and methods are needed to improve users' search experiences by helping them to more quickly locate desired results. There is a need for methods and systems that recognize certain indications of the nature or quality of the search query. There is also a need for systems and methods that aid users in improving their searches based on these determinations.

SUMMARY OF THE INVENTION

In various embodiments, the present invention provides methods and systems for categorizing the quality of the search by analyzing the relevancy numbers associated with the search results. Based on this categorization, the system alters how the search results are displayed, such as, for example, by adjusting the total number of search results to display or by providing feedback to the user regarding the quality of the search query or suggestions for altering it to improve the relevancy profile of the results.

In some embodiments, the system samples the relevancy numbers associated with the results. Then, the relevancy numbers are compared to established patterns to categorize the quality of the search query. Based on the determined quality category, the results display is changed accordingly. For example, the number of results to display, the message to display to the user, or in some embodiments a subsequent action the system executes, can all be based on the quality category. The display parameters and subsequent actions are fully customizable. For example, based on a determined category, the system may run a spell check on the query, open a new search dialog box, or the like.

BRIEF DESCRIPTION OF THE DRAWINGS

FIG. 1 is a collection of four tables, each table shows the topic title and relevancy number of the top 10 results for the example search query shown.

FIG. 6 is a table summarizing the outputs to display to the user as determined by the search category.

Figure 2:
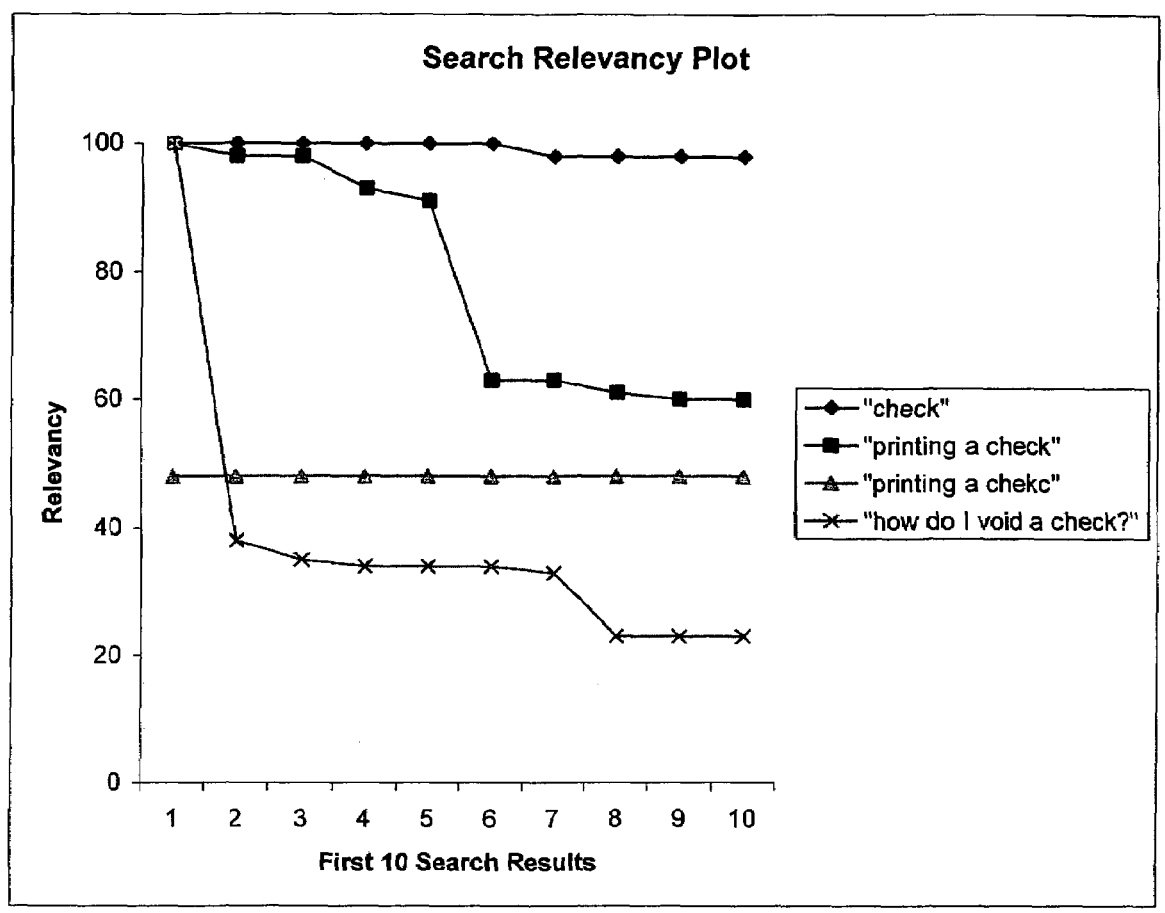
FIG. 2 is a plot of the relevancy number of the first 10 search results for each example query.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

According to one embodiment, the present invention provides methods for categorizing the quality of a search. The present invention will be described in the context of an indexed help file included in a financial management software package such as QuickBooks® by Intuit, Inc. of Mountain View, Calif., that has been loaded onto a user's computer. The specific application discussed herein uses AnswerWorks® by Vantage Software Technologies, Newtown, Pa., a third party search engine that by default returns the top 100 results listed in order of relevancy, each with a relevancy number, in response to a user entered search string. It will be readily understood by those ordinarily skilled in the art that the software products, methods and systems described could be applied in other contexts, including web-based help files and general purpose databases accessible over the internet without departing from the teachings disclosed herein. As those skilled in the art will also appreciate, the invention can be applied in conjunction with other search engines configured to calculate and output any scoring system for assessing results in response any type of query, also without departing from the teachings of this disclosure.

Examples of Relevancy Curves for Searches

In this section the derivation of relevancy curves will be described. Referring to FIG. 1, there is shown four examples of queries and the top 10 of the top 100 results by relevancy. In these examples, the relevancy metric is an integer between 0 and 100, where 100 is the maximum obtainable relevancy. These examples have been chosen to illustrate common patterns in the curve or profile of the relevancy numbers that occur for each of the given situations. These patterns are the basis for differentiating between categories of searches described in the next section.

In Example 1, the search string "check" has been entered into the search engine. The top ten results and associated relevancy numbers for this example demonstrate a common pattern that emerges when the query is too broad. Because many topics in the help file of a financial management software application discuss checks, the relevancy numbers of all top ten results are high. Because the query is so broad, the context for the use of the word "check" is missing. Note that some results, such as "Checking the Status of your entire inventory" and "Checking your inventory status" are likely to be irrelevant to "check" in the sense of a written order directing a bank to pay money. Thus, the user may waste time reviewing them all without realizing that a more specific query would be helpful to find the desired material.

In Example 2, the search string "printing a check" has been entered. This time, the top ten results and associated relevancy numbers demonstrate a pattern that emerges for good searches. The relevancy numbers of the top ten results starts high and tapers off. With the added words "printing a" to "check", the search engine no longer returns the "Checking the Status of your entire inventory" and "Checking your inventory status" results within the top ten. Thus, the search engine has more successfully identified a small number of results with a high likelihood of having useful information.

In Example 3, the search string "printing a chekc" has been entered. Because the last word in the search string contains a typographical error, the top ten results and associated relevancy numbers demonstrate a pattern that emerges for searches containing a spelling mistake or terminology difference. The relevancy numbers of the top ten results are uniformly quite low. None of these results are likely to contain the information the user wanted on printing a check.

In Example 4, the search string "how do I void a check?" has been entered. The top ten results and associated relevancy numbers demonstrate a pattern that emerges for excellent searches. The relevancy number for the top result is very high, followed by a sharp, tapering drop off for the rest of the top ten results. The search engine has identified an even smaller number of results that have a high probability of containing relevant information, in this case, one result.

Referring to FIG. 2, the relevancy number is plotted for each of the first ten search results (i.e., the top ten search results in order of relevancy) for each of the Examples 1-4 from FIG. 1. On FIG. 2, line segments connect the points of these plots in order to more clearly demonstrate the change in relevancy over the first ten results in each series. Thus, the patterns discussed above from the tables in Examples 1-4 are shown in graphical form in FIG. 2.

Categorizing Searches

In one implementation, the present invention analyzes the relevancy profile of the search results to categorize the search query, for example as being excellent, good, likely to contain a spelling mistake or terminology difference, or too broad/general. Examples 1-4 were provided to show the types of patterns that appear in the relevancy numbers, thus showing the cases to differentiate by using appropriate criteria in the categorization algorithm. The categorization algorithm determines which category is most appropriate for the search based on the relevancy numbers returned for the results.

Categories for searches are defined by criteria that the search results must satisfy. In this implementation, a criterion is a range of relevancy numbers for a given result in the sample. Categories are determined by evaluating the relevancy numbers of the relevant search results against the category criteria. For instance, for one example category, the criterion could be that the top result must have a relevancy number of at least 95 out of 100. Thus, the relevancy number of the top result of a search would be evaluated using this criterion to determine whether the search belongs in this category. Categories can also be defined by multiple criteria. An additional criterion to the example category could be that the second result has a relevancy number less than 95. In some embodiments, criteria such as these are established to evaluate the relevancy number of each result in the entire result set returned for the search. In others, criteria are only established for a sample of results. The advantage of limiting the number of results for which category criteria are applied is a reduction in processing time needed to categorize the search according to the algorithm.

Referring to FIG. 6 for illustration purposes, suppose 4 categories are defined. Category 1 searches return excellent results. Category 2 searches return good results. Category 3 searches return too many results with high relevancy values, indicating an imprecise search. Category 4 searches return results with relevancy numbers that are too low, indicating a terminology difference or spelling mistake in the search query.

An example of a categorization algorithm that would divide searches into the above categories contains the following conditions. In this example, because the criteria for the categories are not mutually exclusive, the relevancy numbers of the search results are evaluated against the set of conditions for one category before moving to the next set of conditions for the next category. Once a category is assigned for the search, the algorithm ends.

If first result's relevancy is equal to 100 and the third result's relevancy is less than 95, then this is a Category 1 search string.

Otherwise, if the first result's relevancy is greater than 95 and the tenth result's relevancy is less than 60, then this is a Category 2 search string.

Otherwise, if the first result's relevancy is greater than 95 and the tenth result's relevancy is greater than 85 then this is a Category 3 search string.

Otherwise, if the first result's relevancy is less than 60 then this is a Category 4 search string.

In some embodiments, a catch-all or default category is assigned at the end of the algorithm such that the search is assigned to that category if the search has not been assigned up to that point.

Categories are fully customizable through altering the criteria used to evaluate to the relevancy numbers of the results to make the categorization. Criteria are selected for categories that make the categories meaningful in the particular application of the invention.

Figure 3:
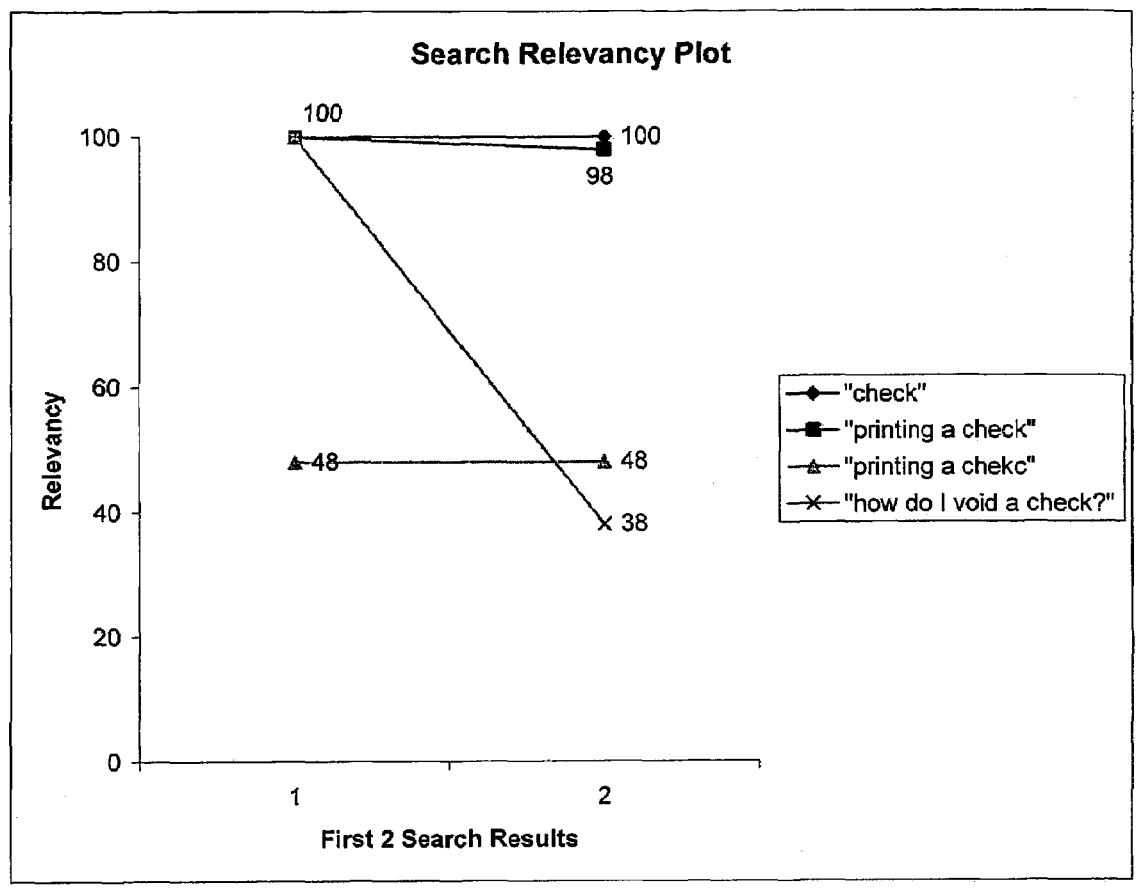
FIG. 3 is a plot of the relevancy number of the first 2 search results for each example query.

FIG. 3 illustrates an example wherein a sample size of only two results, in this case, the top two results, is used to categorize a search. Using an appropriate categorization algorithm, categories corresponding to the same four categories as in the above example can be defined: Category 1 search strings return excellent results. Category 2 search strings return good results. Category 3 search strings return too many results with high relevancy values, indicating an imprecise search. Category 4 search strings return results with relevancy numbers that are too low, indicating a terminology difference or spelling mistake in the search string. An example algorithm that makes this categorization is as follows. Again, because the criteria for the categories are not mutually exclusive, the relevancy numbers of the search results are evaluated against the set of conditions for one category before moving to the next set of conditions for the next category. Once a category is assigned for the search, the algorithm ends.

- If the second result's relevancy is equal to 100, then this is a Category 3 search string.
- Otherwise, if the second result's relevancy is greater than 95, then this is a Category 2 search string.
- Otherwise, if the first result's relevancy is greater than 95 and the second result's relevancy is less than 60, then this is a, Category 1 search string.
- Otherwise, if the first result's relevancy is less than 60 then this is a Category 4 search string.

As in the previous example, in some embodiments, a catch-all or default category is assigned at the end of the algorithm such that the search is assigned to the default category if the search has not been assigned up to that point.

Figure 4:
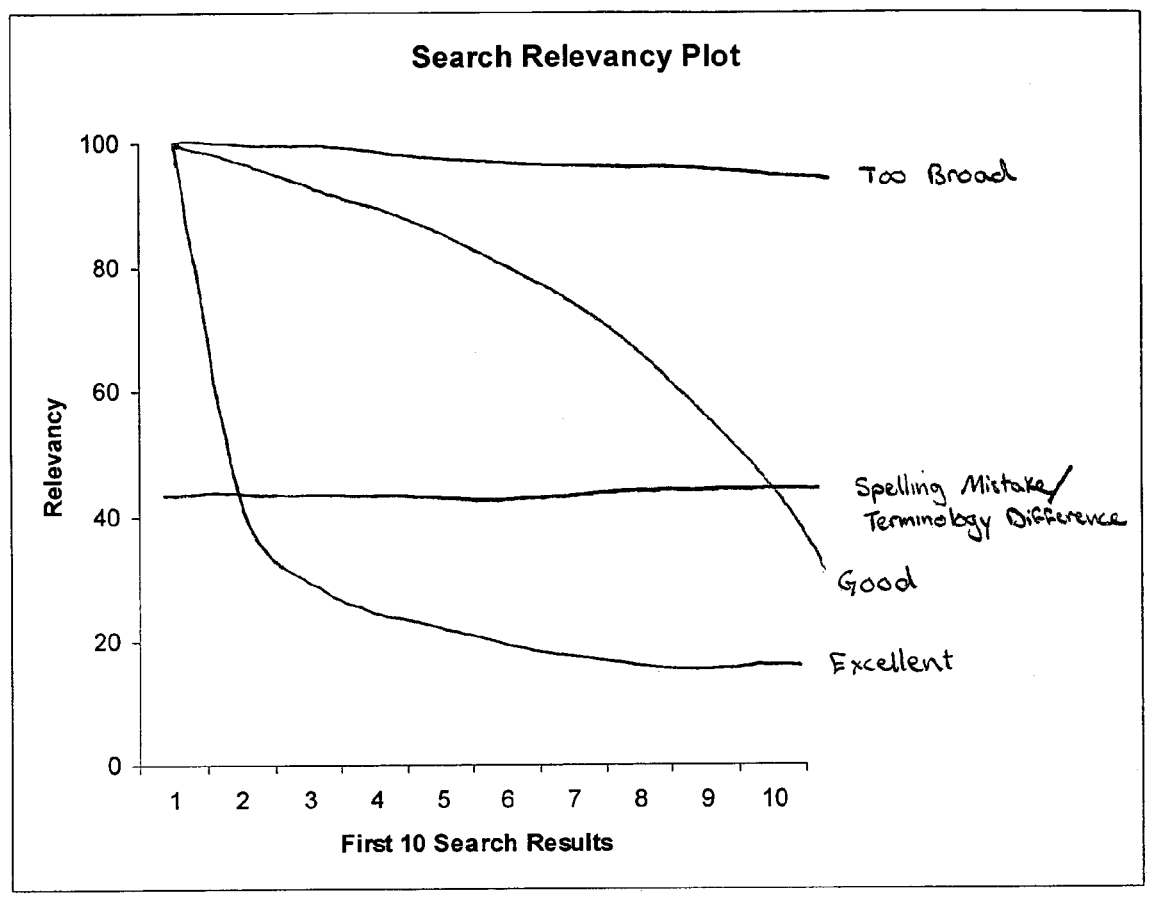
FIG. 4 is a plot of four archetypical patterns of relevancy numbers.
Figure 5:
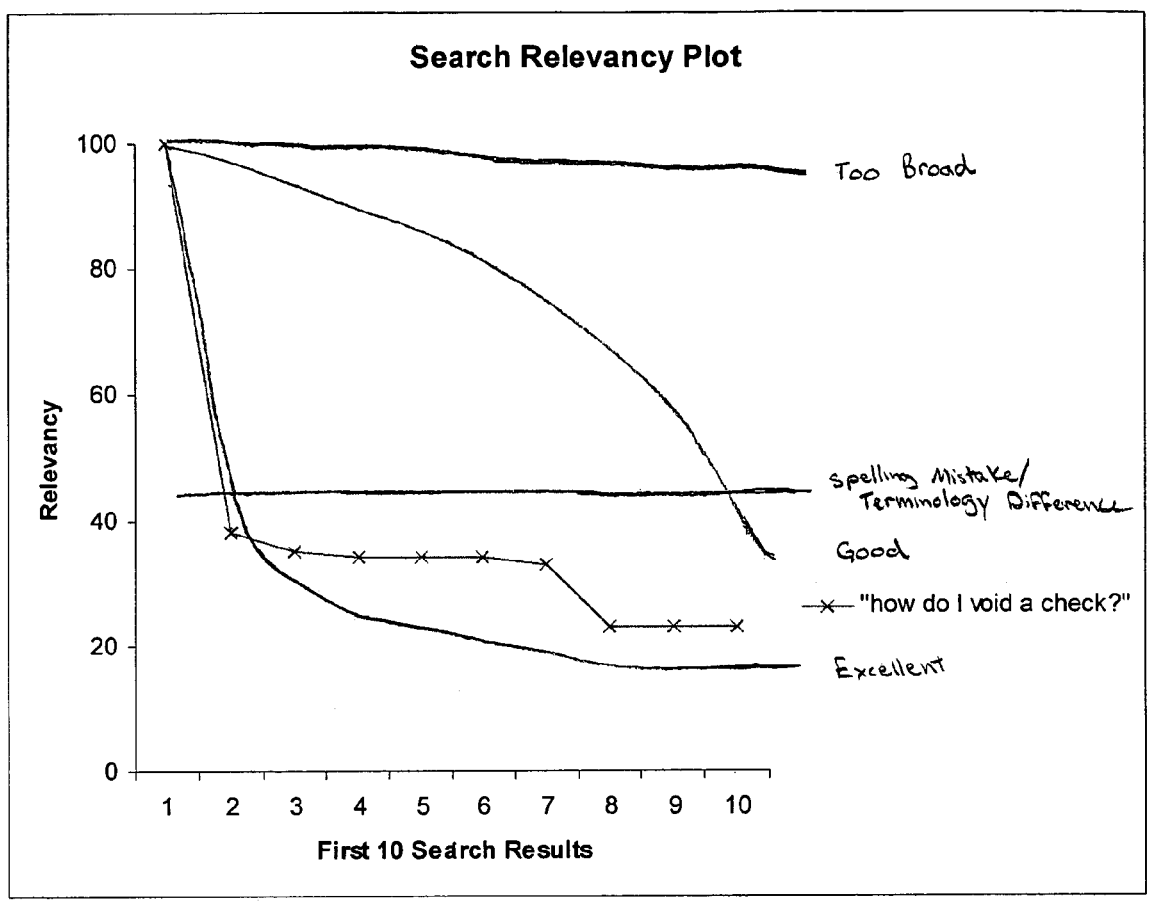
FIG. 5 is a plot of the four archetypical patterns of relevancy numbers and one example query.

In an alternative embodiment, categories are determined by comparing the relevancy plot for a search to one or more archetypical patterns for relevancy plots. Each archetypical pattern corresponds to a category. FIG. 4 illustrates a set of archetypical patterns, one showing the pattern for a search that is too broad, one with a spelling mistake or terminology difference, one good search, and one excellent search. In some implementations, the category for a search is determined by calculating which of the archetypical patterns is the best fit to the data points of the relevancy plot for the search. The best-fit calculation may be accomplished by finding the sum of the absolute differences between the archetype curve and the relevancy curve for each archetype curve. In other implementations, the best fit is determined by assigning proportionally more weight in the best fit analysis to a subset of the data points, such as the relevancy numbers of the first 5 results. One of ordinary skill in the art will recognize many other methods of calculating which archetype is the closest match are possible. Referring to FIG. 5, there is shown the relevancy plot of one of the example search strings with the four archetypical patterns plotted on the same graph. As can be seen from FIG. 5, the plot of the example search string "how do I void a check?" most closely matches the archetypical curve for an excellent search. Thus, the example search is categorized as a Category 1 (Excellent) search.

Using the Categorization

Once a search has been categorized, the category can be used to determine outputs such as display characteristics of the search results or subsequent actions. FIG. 6 is a table summarizing an example set of display characteristics for the four categories of the above examples including the number of results displayed and the suggestions displayed to the user. In some embodiments, the number of results displayed and the suggestions displayed are tailored to the quality of the search in some embodiments. The following describes the example in FIG. 6:

For category 1 (Excellent Results) searches, 7 results are displayed. For category 1 searches, there is a high degree of probability that the information a user desires is contained in one of the first few hits because the relevancy numbers start high and taper off quickly.

For category 2 (Good Results) searches, a few more results (9 results) are displayed. The relevancy numbers do not taper off as quickly, so to maintain the confidence that the information a user desires is contained in one of the displayed results, the number of displayed results is slightly increased.

For category 3 (Too Many Hits) searches, slightly more results (10 results) are displayed along with suggestions to make the search more specific or rephrase the request as a simple question. Because the relevancy numbers for category 3 searches are high throughout the first ten results, the information a user desires may or may not be contained in any of the first ten results. Only displaying 10 results encourages the user to follow the suggestion of making the search more specific or rephrasing instead of potentially wasting time reviewing many results that have a lower probability of containing the desired information.

Figure 7:
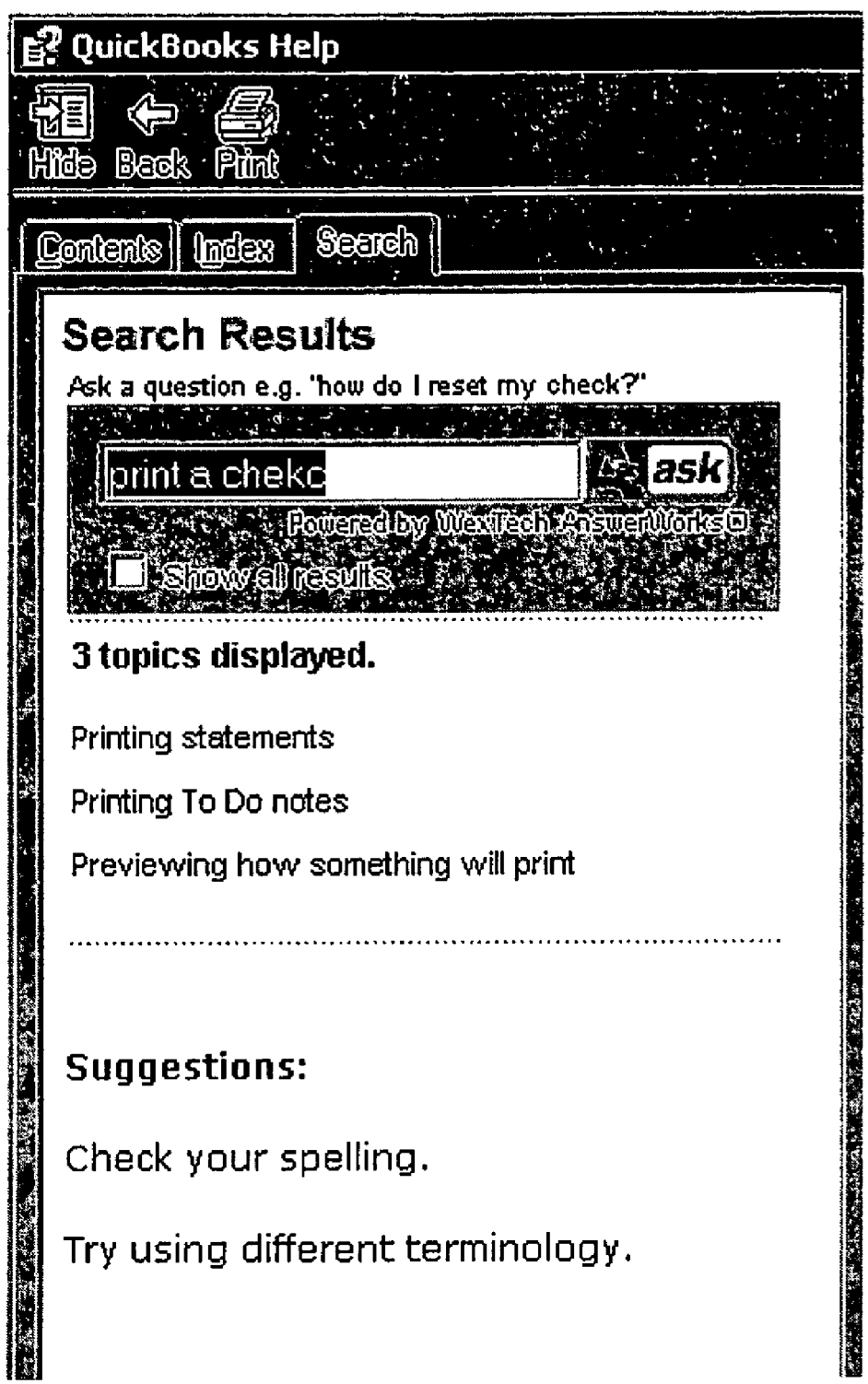
FIG. 7 is a screen shot of a search results dialog box.

Lastly, for category 4 (Relevancy Too Low) searches, only 3 results are displayed along with suggestions to check spelling or use different terminology. Because the relevancy numbers for the search results are low throughout, there is a low probability that the top results returned for the search contain the information the user desires. Thus, only displaying the top 3 results encourages the user to follow the suggestion of checking spelling or using different terminology to obtain better results, rather than wasting time reviewing many results with low relevancy scores. FIG. 7 illustrates how the search results and suggestions are displayed to the user for a category 4 search in one embodiment.

In other embodiments, the search category determination may trigger other actions based on the determination, such as displaying or otherwise outputting the category; generating feedback for tracking purposes; displaying a message associated with the category, such as suggestions for altering the search string, or technical support information or phone numbers; formatting the output such as by including graphics, altering the font, or the like; playing a category-specific sound to alert the user; instigating a spelling check on the entered search string if it is determined that a search string is likely to be misspelled; opening a new search window or a help window; performing searches on different data sources; or the like. In addition, the search category determination may trigger the display of targeted advertisements or content. For example, advertisements for instructional manuals or classes may be displayed if it is determined from the search category that the user may not be using the correct terminology or is otherwise receiving low quality results.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of categorizing quality of a search query, comprising:
   receiving search results in response to a search query, each search result having a numeric relevancy metric;
   evaluating a group of the search results, the group consisting of at least a subset of the search results, wherein evaluating the group of search results comprises comparing the numeric relevancy metrics for search results in the group to at least one pre-determined pattern of numeric relevancy metrics to obtain a set of relevancy numbers;
   determining a categorization criterion based on the set of relevancy numbers, wherein the categorization criterion comprises a range of the set of relevancy numbers;
   determining a set of categories based on the categorization criterion;
   categorizing the quality of the search query based on the set of categories; and
   generating and storing output reflecting the categorizing.

2. The method of claim 1, wherein comparing the numeric relevancy metrics for search results in the group to at least one pre-determined pattern comprises performing best fit calculations between the numeric relevancy metrics for the search results in the group and at least one archetypical pattern of numeric relevancy metrics.

3. The method of claim 1, wherein comparing the numeric relevancy metrics for search results in the group to at least one pre-determined pattern comprises performing best fit calculations between the numeric relevancy metrics for the search results in the group and each of at least two archetypical patterns of numeric relevancy metrics.

4. The method of claim 1, wherein the group consisting of at least a subset of the search results includes all search results received in response to the search query.

5. The method of claim 1, wherein search results are ranked by relevancy.

6. The method of claim 1, where in generating output reflecting the categorization comprises displaying a category-specific number of search results.

7. The method of claim 1, wherein generating output reflecting the categorization comprises at least one selected from a group consisting of outputting the category, generating feedback for tracking purposes, displaying a message, formatting the output, playing a sound, running a spell check, opening a window, performing searches on different data sources, and displaying targeted advertisements.

8. A method of categorizing quality of a search query, comprising:
- receiving search results in response to a search query, each search result having a numeric relevancy metric;
- evaluating a group of the search results, the group consisting of at least a subset of the search results, wherein evaluating the group of search results comprises comparing the numeric relevancy metrics for search results in the group to pre-determined numeric relevancy metric range conditions to obtain a set of relevancy numbers;
- determining a categorization criterion based on the set of relevancy numbers, wherein the categorization criterion comprises a range of the set of relevancy numbers;
- determining a set of categories based on the categorization criterion;
- categorizing the quality of the search query based on the set of categories; and
- generating and storing output reflecting the categorizing.

9. The method of claim 8, wherein the group consisting of at least a subset of the search results includes all search results received in response to the search query.

10. The method of claim 8, wherein search results are ranked by relevancy.

11. The method of claim 8, wherein generating output reflecting the categorization comprises displaying a category-specific number of search results.

12. The method of claim 8, wherein generating output reflecting the categorization comprises at least one selected from a group consisting of outputting the category, generating feedback for tracking purposes, displaying a message, formatting the output, playing a sound, running a spell check, opening a window, performing searches on different data sources, and displaying targeted advertisements.

13. A system for categorizing quality of a search query, comprising:
- a processor;
- a memory operatively connected to the processor;
- an evaluator resident in memory, responsive to receiving search results in response to a search query, each search result having a numeric relevancy metric, for:
  - evaluating a group of the search results, the group consisting of at least a subset of the search results, wherein evaluating the group of search results comprises comparing the numeric relevancy metrics for search results in the group to at least one pre-determined pattern of numeric relevancy metrics to obtain a set of relevancy numbers;
- a categorizer resident in memory, coupled to the evaluator, for:
  - determining a categorization criterion based on the set of relevancy numbers, wherein the categorization criterion comprises a range of the set of relevancy numbers;
  - determining a set of categories based on the categorization criterion; and
  - categorizing the quality of the search query based on the set of categories; and
- an output device coupled to memory, coupled to the categorizer, for:
  - generating and storing output reflecting the categorizing.

14. The system of claim 13, wherein comparing the numeric relevancy metrics for search results in the group to at least one pre-determined pattern comprises performing best fit calculations between the numeric relevancy metrics for the search results in the group and at least one archetypical pattern of numeric relevancy metrics.

15. The system of claim 13, wherein comparing the numeric relevancy metrics for search results in the group to at least one pre-determined pattern comprises performing best fit calculations between the numeric relevancy metrics for the search results in the group and each of at least two archetypical patterns of numeric relevancy metrics.

16. The system of claim 13, wherein the group consisting of at least a subset of the search results includes all search results received in response to the search query.

17. The system of claim 13, wherein search results are ranked by relevancy.

18. The system of claim 13, wherein generating output reflecting the categorization comprises displaying a category-specific number of search results.

19. The system of claim 13, wherein generating output reflecting the categorization comprises at least one selected from a group consisting of outputting the category, generating feedback for tracking purposes, displaying a message, formatting the output, playing a sound, running a spell check, opening a window, performing searches on different data sources, and displaying targeted advertisements.

20. A system for categorizing quality of a search query, comprising:
- a processor;
- a memory operatively connected to the processor;
- an evaluator resident in memory, responsive to receiving search results in response to a search query, each search result having a numeric relevancy metric, for:
  - evaluating a group of the search results, the group consisting of at least a subset of the search results, wherein evaluating the group of search results comprises comparing the numeric relevancy metrics for search results in the group to at least one pre-determined pattern of numeric relevancy metrics to obtain a set of relevancy numbers;
- a categorizer resident in memory, coupled to the evaluator, for:
  - determining a categorization criterion based on the set of relevancy numbers, wherein the categorization criterion comprises a range of the set of relevancy numbers;
  - determining a set of categories based on the categorization criterion; and
  - categorizing the quality of the search query based on the set of categories; and
- an output device coupled to memory, coupled to the categorizer, for:
  - generating and storing output reflecting the categorizing.

21. The system of claim 20, wherein the group consisting of at least a subset of the search results includes all search results received in response to the search query.

22. The system of claim 20, wherein search results are ranked by relevancy.

23. The system of claim 20, wherein generating output reflecting the categorization comprises displaying a category-specific number of search results.

24. The system of claim 20, wherein generating output reflecting the categorization comprises at least one selected from a group consisting of outputting the category, generating feedback for tracking purposes, displaying a message, formatting the output, playing a sound, running a spell check, opening a window, performing searches on different data sources, and displaying targeted advertisements.

25. A computer readable storage medium for categorizing quality of a search query having instructions encoded thereon for enabling a processor to perform:

receiving search results in response to a search query, each search result having a numeric relevancy metric;

an evaluator, responsive to receiving search results in response to a search query, each search result having the numeric relevancy metric, for:

evaluating a group of the search results, the group consisting of at least a subset of the search results, wherein evaluating the group of search results comprises comparing the numeric relevancy metrics for search results in the group to at least one pre-determined pattern of numeric relevancy metrics to obtain a set of relevancy numbers;

a categorizer, coupled to the evaluator, for:

determining a categorization criterion based on the set of relevancy numbers, wherein the categorization criterion comprises a range of the set of relevancy numbers;

determining a set of categories based on the categorization criterion; and categorizing the quality of the search query based on the set of categories; and an output device, coupled to the categorizer, for:

generating and storing output reflecting the categorizing.

26. The computer readable storage medium of claim 25, wherein comparing the numeric relevancy metrics for search results in the group to at least one pre-determined pattern comprises performing best fit calculations between the numeric relevancy metrics for the search results in the group and at least one archetypical pattern of the numeric relevancy metric.

27. The computer readable storage medium of claim 25, wherein comparing the numeric relevancy metrics for search results in the group to at least one pre-determined pattern comprises performing best fit calculations between the numeric relevancy metrics for the search results in the group and each of at least two archetypical patterns of numeric relevancy metrics.

28. The computer readable storage medium of claim 25, wherein the group consisting of at least a subset of the search results includes all search results received in response to the search query.

29. The computer readable storage medium of claim 25, wherein search results are ranked by relevancy.

30. The computer readable storage medium of claim 25, wherein generating output reflecting the categorization comprises displaying a category-specific number of search results.

31. The computer readable storage medium of claim 25, wherein generating output reflecting the categorization comprises at least one selected from a group consisting of outputting the category, generating feedback for tracking purposes, displaying a message, formatting the output, playing a sound, running a spell check, opening a window, performing searches on different data sources, and displaying targeted advertisements.

32. A computer readable storage medium for categorizing quality of a search query having instructions encoded thereon for enabling a processor to perform receiving search results in response to a search query, each search result having a numeric relevancy metric;

evaluating a group of the search results, the group consisting of at least a subset of the search results, wherein evaluating the group of search results comprises comparing the numeric relevancy metrics for search results in the group to at least one pre-determined pattern of numeric relevancy metrics to obtain a set of relevancy numbers;

determining a categorization criterion based on the set of relevancy numbers, wherein the categorization criterion comprises a range of the set of relevancy numbers;

determining a set of categories based on the categorization criterion;

categorizing the quality of the search query based on the set of categories; and generating and storing output reflecting the categorizing.

33. The computer readable storage medium of claim 32, wherein the group consisting of at least a subset of the search results includes all search results received in response to the search query.

34. The computer readable storage medium of claim 32, wherein search results are ranked by relevancy.

35. The computer readable storage medium of claim 32, wherein generating output reflecting the categorization comprises displaying a category-specific number of search results.

36. The computer readable storage medium of claim 32, wherein generating output reflecting the categorization comprises at least one selected from a group consisting of outputting the category, generating feedback for tracking purposes, displaying a message, formatting the output, playing a sound, running a spell check, opening a window, performing searches on different data sources, and displaying targeted advertisements.

* * * * *